Nov. 14, 1933.        W. F. GROENE        1,934,975
CHUCKING DEVICE
Filed Feb. 20, 1930        3 Sheets-Sheet 1

INVENTOR
William F. Groene
BY
Allen & Allen
ATTORNEYS.

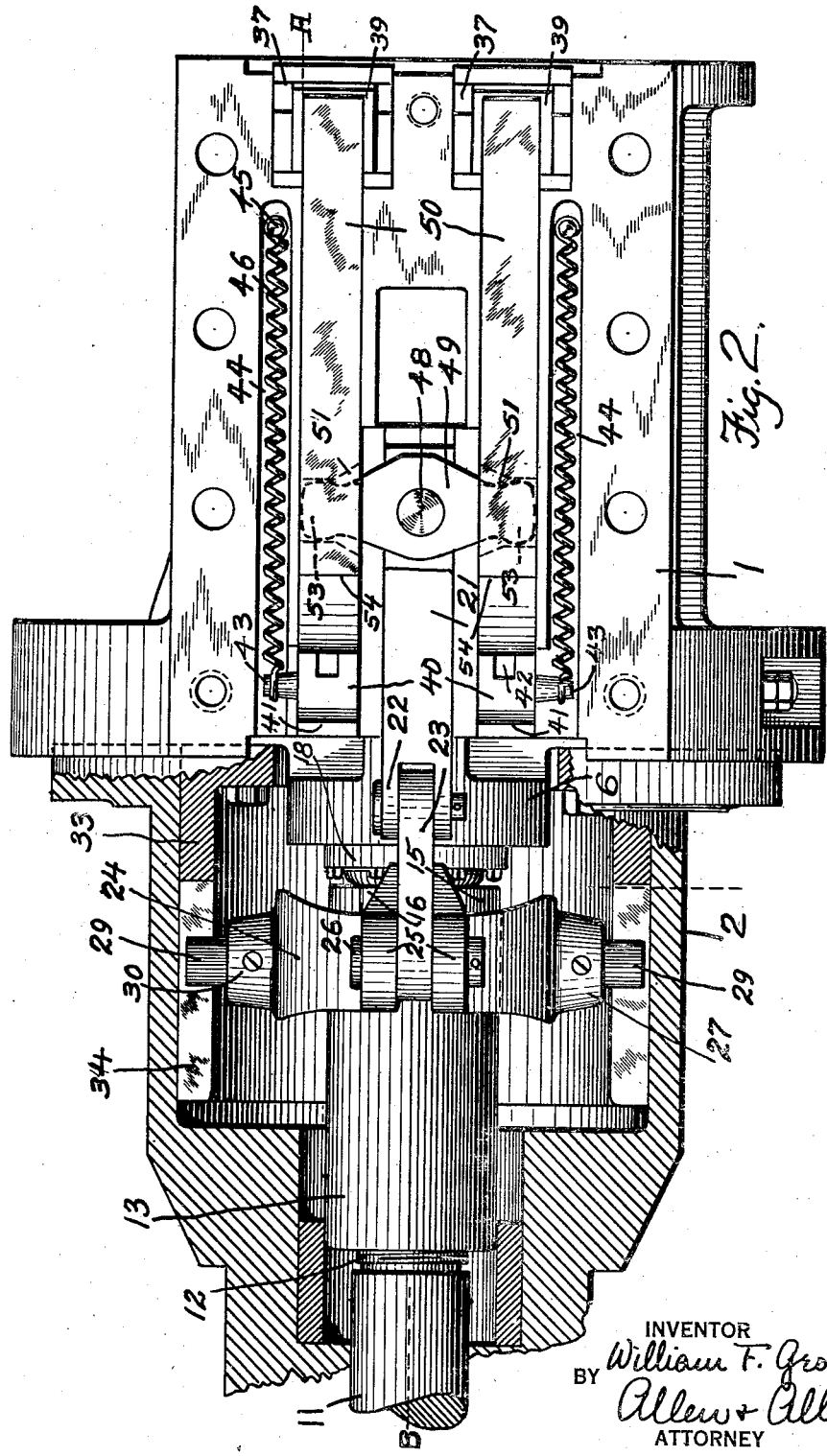

Nov. 14, 1933.   W. F. GROENE   1,934,975
CHUCKING DEVICE
Filed Feb. 20, 1930   3 Sheets-Sheet 3
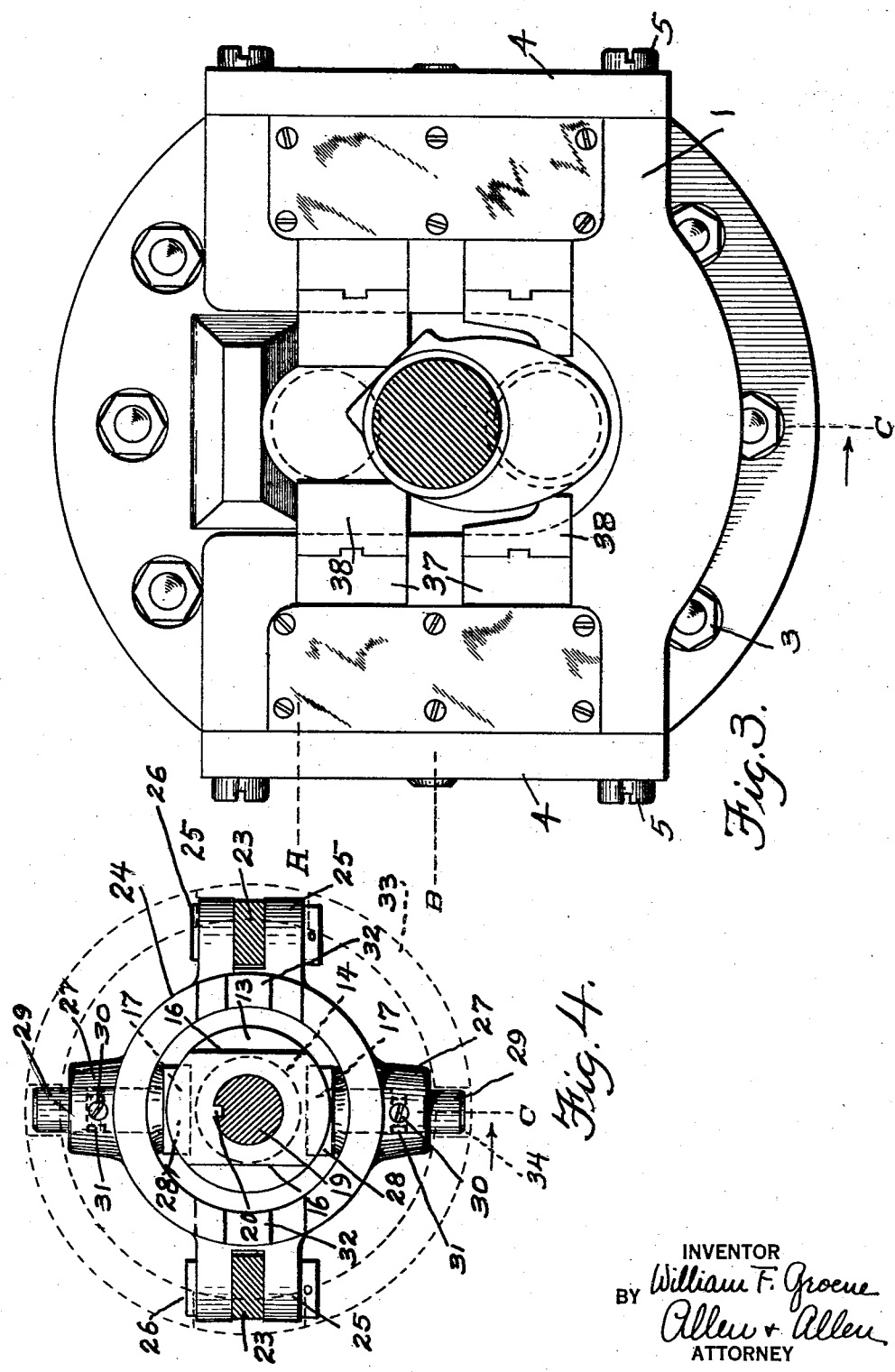
INVENTOR
BY William F. Groene
Allen + Allen
ATTORNEY Patented Nov. 14, 1933

1,934,975

UNITED STATES PATENT OFFICE 1,934,975

CHUCKING DEVICE

William F. Groene, Cincinnati, Ohio, assignor to The R. K. LeBlond Machine Tool Company, Cincinnati, Ohio, a corporation of Delaware Application February 20, 1930. Serial No. 429,974

17 Claims. (Cl. 82—40)

This invention relates to that class of devices known as power chucks used in machine tools for holding the work. It is very essential in the gripping of the work, when placed on the centers of a lathe, that when the jaws attack the work in their final holding grip, they do so without moving it from its central line up and that it does so without twisting or distorting the work and that once it has gripped the work, the grip be maintained irrespective of what happens to the air pressure. All of this the herein disclosed invention does in a novel manner.

In the illustration shown, the chuck is designed for holding an engine crank shaft having a number of throws or cranks to be worked on. These crank shafts are to be clamped as a rough forging having similar points of contact but with the usual variations and imperfections of a forging so that the gripping means must have within its structure possibilities for equalization that can be accomplished before the final clamping of these gripping means take place, so that at the time the final pressure is applied, the parts of the chuck have so adjusted themselves to the work that there is no strain or distortion evident.

All of these requirements have been met in this invention in a novel manner which is illustrated in the drawings and will be set forth in the claims.

In the drawings:—

Figure 2 is a side elevation, part section on line C of Figures 1, 3 and 4.

Figure 3 is a front elevation of the chuck part of the shaft shown gripped in the jaws being in section.

Figure 4 is an elevation of the equalizer bridle in the spindle, parts being in section on line D of Figure 2.

Figure 1:
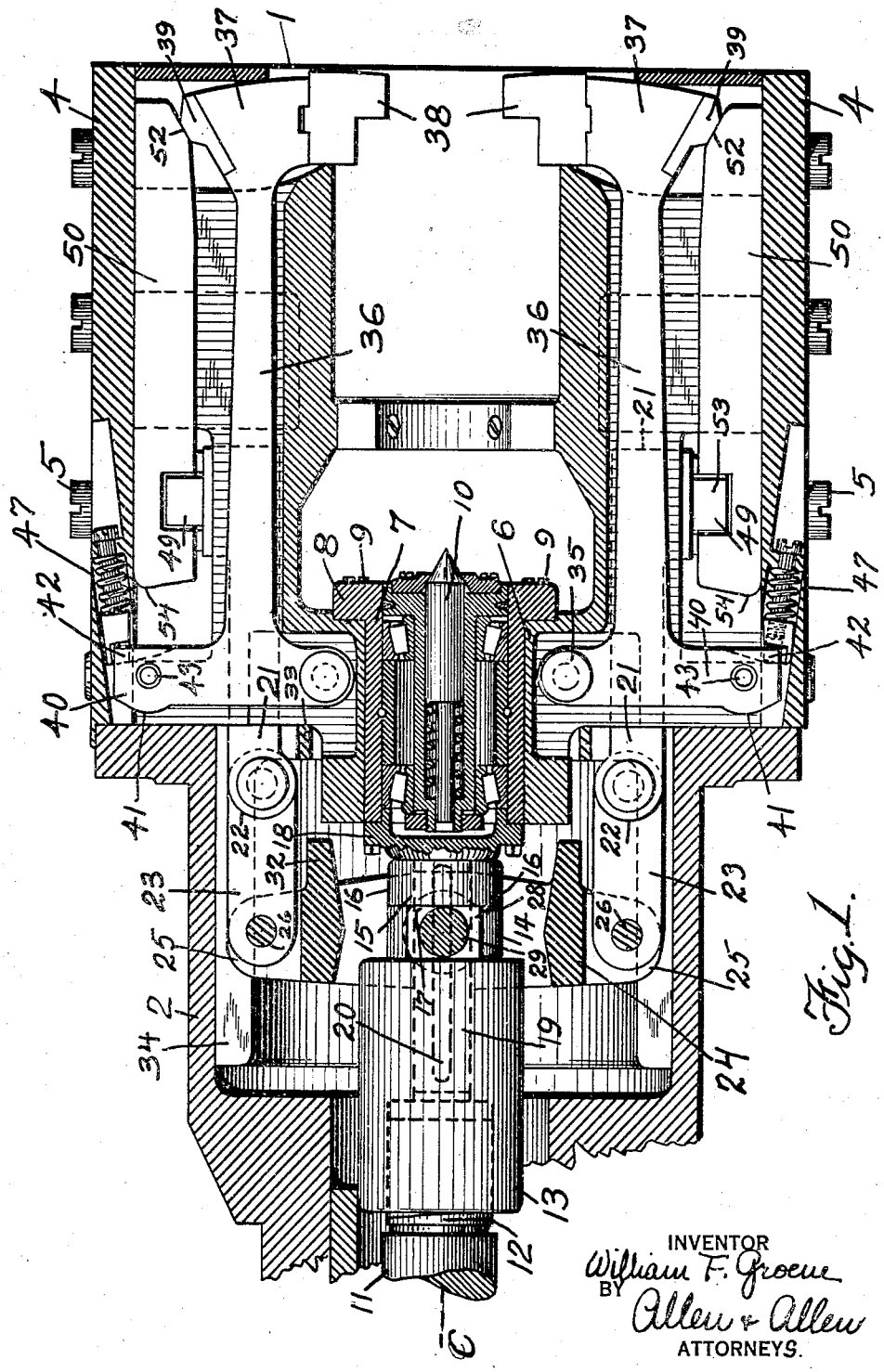
Figure 1 is a horizontal longitudinal section on lines A and B, the section of line A extending the length of the chuck body and the section of line B being through the center of the spindle.

Some of the constructions shown in this application are illustrated in my prior Patent No. 1,748,672, granted February 25, 1930, the particular constructions referred to being the centers carried by the head end chuck (this being the chuck herein illustrated), and that carried in the tail end chuck not shown in this application.

These centers differ, as in the application above referred to, in that the head end center is spring yielding and that of the tail end is power applied.

It is to be understood that otherwise the two chucks, the head end chuck and the tail end chuck, wherever referred to in this application for patent are similar in construction.

In its essence, my chucking device comprises revolving members which surround the work except at the top. It provides a mounting for series of swinging jaws which are brought up against the work, which in the illustrated instance is a crankshaft. Actuating piston rods enter the chucks from the body of the machine along the center of rotation and impart movement to a ring or bridle which has an equalizing action which is imparted through link connections to a pair of sliding bars, having mounted on their opposite end, at the side, on a stud an equalizer member, these equalizer members being in working contact with a pair of sliding wedge bars which in turn are adapted to be moved by the equalizer members last mentioned, into wedging contact with a pair of pivotally swinging clamping members which carry hardened clamping jaws for gripping the work.

The swinging clamp members are so arranged that when the wedge bar is in fully retracted position its rear end impinges against a sidewise extension on said members, so that moving the bars rearward until they strike the rear wall of the chuck body, opens the jaws to full extent.

It is quite essential that the swinging clamping members, when about to grip a shaft, do so without a too violent preliminary action, and so that this may be accomplished, certain provisions are made so that the wedge bars, in moving forward after a retraction, upon releasing the swinging clamping members which are under the urge of a spring, will snap to a position of preliminary adjustment a few thousandths away from the shaft, in which position they are held by an adjustable spring mounted buffer, the holding power of this spring buffer being only sufficient to hold the swinging clamp members in a position of preliminary adjustment and being easily overcome as the wedge bars move into position for the final clamping action.

As in my pending application, the head end chuck center is spring mounted and a shaft having been lowered to position and one end engaging this center, the power moved center on the tail end is energized and the shaft held in working position against a stop at the head end center, the center yielding that this may be accomplished.

When the power operative center is retracted the spring will move the idle center outward, preventing the dropping of the shaft and consequent injury of the chuck or the tools of the lathe.

It will be seen from the above that the chuck will have a high degree of accuracy in gripping the work, together with a great saving in time over hand operated chucking devices which require a large degree of individual skill to put into operation.

Referring now to the drawings, the chuck body is indicated at 1, the spindle of the lathe at 2, the chuck body being bolted to the spindle 2 by the bolts 3. The sides of the chuck body 1 are formed by plates 4 held in place by bolts 5, these plates being of steel and forming a thrust resistant member as will be later explained. In the rear wall of the chuck body 1 is formed a sleeve 6, and mounted in this sleeve 6 is a bushing 7 having a flange 8 on its outer end, this flange being bolted to the chuck body by bolts 9 in the rim of the flange. This bushing 7 has mounted in its interior a roller bearing, spring mounted center pin 10, the center pin being capable of rearward movement under pressure.

A piston rod 11 projects through the hollow spindle 2 and carries a threaded portion 12. Mounted on the threaded portion of the piston rod 12 is a bushing 13, this bushing having on the end toward the chuck body a reduced portion 14, this being followed by a portion 15 which is of the same diameter as the body of the bushing, but having at 16 two flattened portions, the flattened portions 16 being flush with the diameter of the reduced portion 14. The effect of this construction being that of a flanged portion as at 17, thus forming one member of what is familiarly known as a bayonet joint. On the rear of bushing 7 is mounted an end piece 18 having an elongated portion 19 which carries a key 20, this key extending into a keyway in the bushing 13. This holds the piston rod against rotation during its movement, and permits the bushing 7 by turning, to turn the bushing 13.

Mounted in a slot in one side face of the chuck body 1 is a sliding bar 21, this bar having on the end toward the spindle 2 a bifurcated portion 22. A similar bar is mounted on the opposite face of the chuck body. Pivoted in the bifurcated portions of the bars 21 are links 23. A ring or bridle 24 in the spindle housing 2 has, on either side, a pair of ears 25, one end of links 23 extending into these ears and having a pin 26 holding them together.

Mounted in bearings 27 on the ring 24 are swiveling shoes 28, these shoes having a round stem 29 extending through the bearings and extending for a distance beyond. The shoes are held in position by screws 30, the inner point of which extend into a slot 31 in the circumference of the stem 29, thus allowing a slight turning of the shoes if necessary. A pair of stops 32 are formed on the ring or bridle 24, these stops being adapted to strike the extension of the chuck body where it projects into the spindle cavity, thus preventing excess movement of the wedge bars and consequent damage to the chuck assembly.

The construction above described provides for a speedy disassembly of the chuck body and all its parts from the spindle of the lathe and the power moving parts of the fluid pressure cylinder (not shown) as represented by the bushing 13 on the end of the piston rod 11, it being only necessary to remove the bolts 9 from the flange of the bushing 7, turn the bushing 90°, thus turning by means of the key and keyway, the bushing 13 on the end of the threaded portion of the piston rod 11, thus bringing the flattened portion of the bushing opposite the shoes 28 when the bushing 7 and the ring 24 with all its parts together with the chuck body may be removed bodily from the spindle 2.

It is to be noted that bolted on the rear of the chuck body is a guide housing 33 having slots 34 into which the extended ends of stems 29 project. This construction prevents any distortion of the ring bridle when pressure is applied.

Proceeding with the parts description and looking at Figures 1 and 2, especially, note that on pivots 35 are mounted sets of swinging clamps or holding arms 36 having at their forward end a hammer shaped head 37, this head having on the side toward the center of the chuck body, hardened steel faces 38 for gripping the shaft. On their outer face they have a hardened plate 39, this plate being mounted at an angle. These plates are fastened by the usual screws securely to the arms.

At the rear end of arms 36 are outwardly extending portions or arms 40, these arms on their rear edges having a strike portion 41 and on their front edges milled slots 42. Extending transversely from the arms 40 near their extreme outer ends are pins or studs 43. In the chuck body are slots 44 extending forward toward the outer end of the body and having near their forward ends, remote from the arms 36 pins or studs 45. Tension springs 46 connect to these studs 45, having their opposite ends fastened to the pins 43 on the arms 40, the effect of the springs being to urge the arms 36 and their gripping portions toward the shaft at all times.

The side plates 4 have passages extending forwardly from the arm portions 40, inclining outward for access to screws passing through ribs inside the passages and threaded into stops 47 slidable in the rear inner ends of the passages with their rear ends milled to fit the slots 42 of arm portions 40. Helical springs around the screws between the stops and the ribs press the stops backward as far as permitted by the heads of the screws engaging with the ribs, by which these stops 47 are adjusted forwardly or rearwardly to be engaged later or earlier in the swinging of the arms 36, as later will be described.

The clamping actions will now be described: The rearward construction of sliding bars 21 having been described, attention is now called to the forward end.

On the outward end parts of the bars 21 are mounted the respective studs 48, each stud carrying an equalizer arm 49 free to swing forward or rearward as needed.

Located above and below the sliding bars 21 in slots milled in the sides of the chuck body 1 are pressure bars 50, these bars having near their rear ends slots 51 into which the outer ends 53 of equalizer arms 49 project. At the forward end of each pressure bar 50 is a tapered portion 52, this tapered or sloping portion being in contact with the sloping surface of the outer end of a respective one of the swinging clamp arms 36 and serving when moved forward to force the swinging clamp arms and their gripping heads to grasp a crank-shaft portion, the parts 52 acting as a wedge on parts 39.

At the extreme rear end of the pressure bars 50 they are slightly tapered, forming a projecting portion 54 which, when the bars are retracted, strike the extended portion 40 of the swinging clamp arms, causing them to move rearward until the strike portion 41 hits the wall of the spindle. When this occurs the retracting piston and all the co-ordinating parts have reached the limit of their travel and the parts come to rest with the gripping jaws fully retracted, thus releasing the work, such as a crankshaft for removal.

When a crank-shaft is placed in the lathe to be worked on, it is brought into the lathe by suitable means and one end placed on the head end center 10. Then the power is applied to the center in the tail end chuck (not illustrated herein) and the spring center gives way until the shaft strikes stop 54 when the action of the power center ceases and the clamping or gripping mechanism starts into action.

As the piston rod 11 moves forward it acts through bridle 24 and equalizers 48 to move pressure bars 50 forward, their rear ends releasing clamp arms 36 at projections 40 some time before their front wedging surfaces 52 engage with the heads 37 of these arms 36. This leaves the arms 36 free to be moved in by tension springs 46 until their projections 40 contact with the stops 47. These stops 47 are so adjusted, when the machine is prepared for the job to be done, that, in opposition to tension springs 46, they set the arms 36 with their jaws 38 just about to make contact with the work. When the bars 50, in the rest of their forward movement, wedge against the arms at 52, these bars 50 are equalized with the tension of one or another spring 46 as the reactive resistance, instead of engagement of one or another jaw with the work, as in the prior patent before mentioned. The springs 46 are of such strength as not to be overcome until this equalizing has been practically completed, so that there is practically no tendency to displace the work radially from the lathe centers in the process of equalization. The springs 46 permit the arms 36 to adjust to slight excessive radial projection of irregular or inaccurately centered pieces of work. In such case an arm 36 so adjusting contacts with the work, but these projections, and the force of the springs 46, are not so much as to cause undue pressure and displacement of the work.

It should be noted that the center line of the forces through the sloping or wedging surfaces of the end of the pressure bars and that of the sloping surface of the rear of the head on the swinging clamp or grip bar, is such that even if the fluid exerting the pressure holding them to gripping action should for any reason fail, the pressure bars would not release their pressure and would not be forced from position by strains due to the turning of the crankshaft.

Having thus described my invention, what I claim as new and desire to secure by Letters Patent, is:—

1. In a power chuck the combination with jaw members to engage and hold a piece of work, of power means active in one or the other direction for actuating the jaw members into or out of engagement with the work at the limits of movement of said power means, and spring means yieldable in either direction, holding the jaw members a desired distance from the work between the said limits of movement.

2. In a power chuck the combination with jaw members to engage and hold a piece of work, of power means active in one or the other direction for actuating the jaw members into or out of engagement with the work at the limits of movement of said power means, and spring means yieldable in either direction, holding the jaw members a desired distance from the work between the said limits of movement, said spring means being adjustable to bring the jaw members closely adjacent to but not into firm contact with the work.

3. In a power chuck the combination with jaw members to engage and hold a piece of work, of power means for actuating the jaw members both into and out of engagement with the work at the limits of movement of said power means, and spring means holding the jaw members a desired distance from the work between the said limits of movement, said spring means comprising springs opposing each other, and adjustable to control the point to which the jaws move under said spring means.

4. In a chucking device the combination of a body, a plurality of work engaging jaws having rearward extensions, power actuated means and thrust bars having an equalizer engagement with the power actuated means, said thrust bars arranged to engage the rearward extensions of the jaws, thus opening them, and also arranged to apply a wedging engagement to the jaws, thus closing them over the work, the said two types of engagement of the thrust bars so arranged that there is a portion of the thrust bar movement when the jaws are not engaged, and spring means urging the jaws toward the work to be engaged.

5. In a chucking device the combination of a body, a plurality of work engaging jaws having rearward extensions, power actuated means and thrust bars having an equalizer engagement with the power actuated means, said thrust bars arranged to engage the rearward extensions of the jaws, thus opening them, and also arranged to apply a wedging engagement to the jaws, thus closing them over the work, the said two types of engagement of the thrust bars so arranged that there is a portion of the thrust bar movement when the jaws are not engaged, and spring means urging the jaws toward the work to be engaged, said spring means comprising balanced spring elements arranged to give to the operating faces of the jaws a predetermined relation to the work to be engaged.

6. In a power chuck the combination with a spindle portion, and a chuck body, of a reciprocating axial member in the spindle portion arranged to be moved by power, means on the chuck body engaging slidably but non-rotatably with the axial member, and mechanism mounted on the axial member by a bayonet type joint, said mechanism being coupled with mechanism in the chuck body for actuating the work engaging elements in the chuck body, said means on the chuck body being rotatable, removable holding means for preventing rotation of the said means on the chuck body, which means, when removed, permits the rotation of the means on the chuck body, whereby the axial member will be rotated and the mechanism held thereon by said bayonet joint may be removed.

7. In a power chuck the combination with a spindle portion, and a chuck body mounted thereon, an axially moving power shaft in the spindle, means mounted on the said shaft, and mechanism in the chuck body connected thereto for actuating the chucking devices in said body, said means mounted on the shaft having a bayonet joint therewith, means for holding the shaft normally against rotation and means for rotating said shaft so as to release the said bayonet joint for the purpose described.

8. In a chucking device the combination of a body, a plurality of work engaging jaws, power actuated means, an equalizer on the power means, a second equalizing means, one for each pair of wedge bars, jaw members adapted to be moved by the wedge bars to and away from the work, spring means to urge the jaws to the work, a second spring means to control the first spring means and so arranged to give the operating faces of the jaws a predetermined relation to the work to be engaged, when the jaws are not otherwise controlled.

9. In a power operated chuck, the combination with the casing portions of two pairs of jaws arranged for movement to engage the work, members to operate each one pair of the jaws, said members having an equalizing function, members to operate the jaw operating members, an axially moving power mechanism, and equalizing means between said mechanism and the last named members, whereby compound equalization in application of pressure to the work is obtained.

10. In a power operated chuck, the combination with the casing portions of four jaws arranged for movement to engage the work, members to operate each one pair of the jaws, said members having an equalizing function, members to operate the jaw operating members, an axially moving power mechanism, and equalizing means between said mechanism and the last named members, whereby equalization in application of pressure to the work is obtained, the said members which operate the jaws comprising wedges which push inwardly on the jaws, said wedges having an angle of repose such that when they are operated, a reverse movement applied to the jaws will not dislodge the wedges.

11. In a chuck, a plurality of pairs of work holding jaws, an axially extended operating member, an equalizer connected to said operating member, equalizers operatively related to the respective pairs of jaws, and an operative connection from each one of the latter mentioned equalizers to the first mentioned equalizer.

12. In a chuck, a plurality of pairs of work holding jaws, springs acting in opposite directions on each jaw, holding the jaws at a desired distance from the chuck axis, an axially extended operating member, an equalizer connected to said operating member, equalizers operatively related to the respective pairs of jaws, and an operative connection from each one of the latter mentioned equalizers to the first mentioned equalizer, whereby power greater than that of either spring may be applied equally to the jaws for causing the jaws to grip the work or to retract the jaws from the work.

13. In a chuck, a body having an open work receiving end, levers pivoted remote from said end in said body, jaws fixed on the respective levers near said end, said levers having radially outwardly presented wedging surfaces adjacent to their jaws, pressure bars slidable longitudinally in said body and having surfaces to engage the wedging surfaces of the respective levers, an operating member extended axially of said chuck, and mechanism operatively connecting said operating member to said bars, comprising equalizing means to apply power equally to said bars from said operating member.

14. In a chuck, a body having an open work receiving end, levers pivoted remote from said end of the body, jaws on the respective levers near said end, arms on the respective levers near their pivots, spring means acting on the respective arms to swing the levers radially outwardly, and spring means acting on the respective arms to swing the levers radially inwardly, said oppositely acting spring means adapted to hold the jaws yieldingly at a desired distance from the chuck axis, and means more powerful than either spring for causing the jaws to grip the work or to retract the jaws from the work.

15. In a chuck, a body having an open work receiving end, pairs of levers pivoted remote from said end of the body, jaws on the respective levers near said end, having radially outwardly presented wedging surfaces, pressure bars slidable longitudinally in said body and having surfaces to engage the wedging surfaces of the respective levers, an operating member extended axially of said chuck, and mechanism operatively connecting said operating member to said bars, comprising an equalizer connected to said operating member, equalizers connected to the respective pairs of bars, and operative connections from the first mentioned equalizer to the respective second mentioned equalizers.

16. In a chucking device, work holding jaws, equalizing mechanism to clamp the jaws to the work, allowing independent movement of the jaws to and from the work preliminary to clamping, and yielding means to hold the jaws from movement toward the work until at least a part of the equalization of said mechanism is attained.

17. In a chucking device, work holding jaws, equalizing mechanism to clamp the jaws to the work at one stage of operation and withdrawing the jaws from the work at another stage of operation, and between said stages allowing independent movement of the jaws to and from the work, means yieldingly moving the jaws toward the work, and yielding means to hold the jaws from movement toward the work until at least part of the equalization of said mechanism is attained.

WILLIAM F. GROENE.